United States Patent [19]

Kazumi

[11] Patent Number: 5,257,056
[45] Date of Patent: Oct. 26, 1993

[54] CAMERA

[75] Inventor: Jiro Kazumi, Kanagawa, Japan

[73] Assignee: Canon Kabushiki Kaisha, Tokyo, Japan

[21] Appl. No.: 921,762

[22] Filed: Jul. 30, 1992

[30] Foreign Application Priority Data

Aug. 2, 1991 [JP] Japan .................................. 3-194135

[51] Int. Cl.⁵ .............................................. G03B 9/08
[52] U.S. Cl. .................................................. 354/234.1
[58] Field of Search ...................... 354/146, 226, 227.1, 354/234.1, 235.1, 237, 238.1, 241, 242, 243, 245, 246

[56] References Cited

U.S. PATENT DOCUMENTS 4,378,150 3/1983 Hashimoto et al. .............. 354/234.1
4,804,986 2/1989 Ohnuki et al. ................... 354/226 X

FOREIGN PATENT DOCUMENTS 57-722 1/1982 Japan.

Primary Examiner—Michael L. Gellner
Assistant Examiner—Howard B. Blankenship
Attorney, Agent, or Firm—Fitzpatrick, Cella, Harper & Scinto

[57] ABSTRACT

A camera having a shutter device including leading and trailing curtains includes a first switch arranged to detect the ready-to-travel state and the travel-completed state of the leading curtain, a second switch arranged to detect the ready-to-travel state and the travel-completed state of the trailing curtain, and a decision circuit arranged to determine that the shutter device is abnormal, either when the ready-to-travel state of the leading curtain is not detected by the first switch or when that of the trailing curtain is not detected by the second switch, before an operation of the shutter device. The decision circuit also determines that the shutter device is abnormal, after completion of control over the travels of the leading and trailing curtains by the shutter device, if the travel-completed state of the leading curtain is not detected by the first switch within a predetermined period of time after the travel-completed state of the trailing curtain is detected by the second switch.

6 Claims, 2 Drawing Sheets

CAMERA

BACKGROUND OF THE INVENTION

1. Field of the Invention

This invention relates to a camera arranged to be capable of detecting abnormalities of the shutter.

2. Description of the Related Art

Some of the known electrically-controlled type shutter devices for cameras are arranged to electrically detect an abnormal shutter action and to give a warning.

For example, a camera disclosed in Japanese Utility Model Application Laid-Open No. SHO 57-722 is arranged to detect, by first switch means, whether or not the shutter is closed; to detect, by second switch means, whether or not the shutter is fully open; to determine, by a decision circuit, whether the shutter blades are in correct positions before and after the generation of a shutter control signal; and to give a warning if the shutter is determined to be malfunctioning.

According to the above-stated arrangement of the prior art, however, it has been impossible to confirm the accuracy of the shutter action, though the shutter action is detectable. Further, since the movement of shutter blades is detected by a mechanical switch according to the prior art arrangement, the bouncing or chattering of the detection switch prevents accurate detection of the travel of the shutter. Therefore, a warning might be given even when the shutter action is normally performed.

SUMMARY OF THE INVENTION

It is an object of this invention to provide a camera which is of the kind capable of controlling the shutter speed through the travels of leading and trailing curtains of the shutter and is also capable of accurately detecting the abnormalities of the shutter by detecting the states of the leading and trailing curtains and by making a check for the timing of changes taking place in the states of the leading and trailing curtains.

It is another object of the invention to provide a camera which is arranged to make a check, within a given period of time, for the timing of changes in the states of shutter curtains especially where such timing tends to allow chattering to occur, so that any faulty detection of the abnormalities in shutter operation can be prevented.

It is a further object of the invention to provide a camera which is arranged to make a check for the timing of changes in the state of the leading curtain of the shutter only in a case where the shutter speed is lower than a given value, so that the shutter action can be more accurately detected.

These and other objects and features of the invention will become apparent from the following detailed description of an embodiment thereof taken in connection with the accompanying drawings.

DETAILED DESCRIPTION OF THE PREFERRED EMBODIMENT

Figure 1:
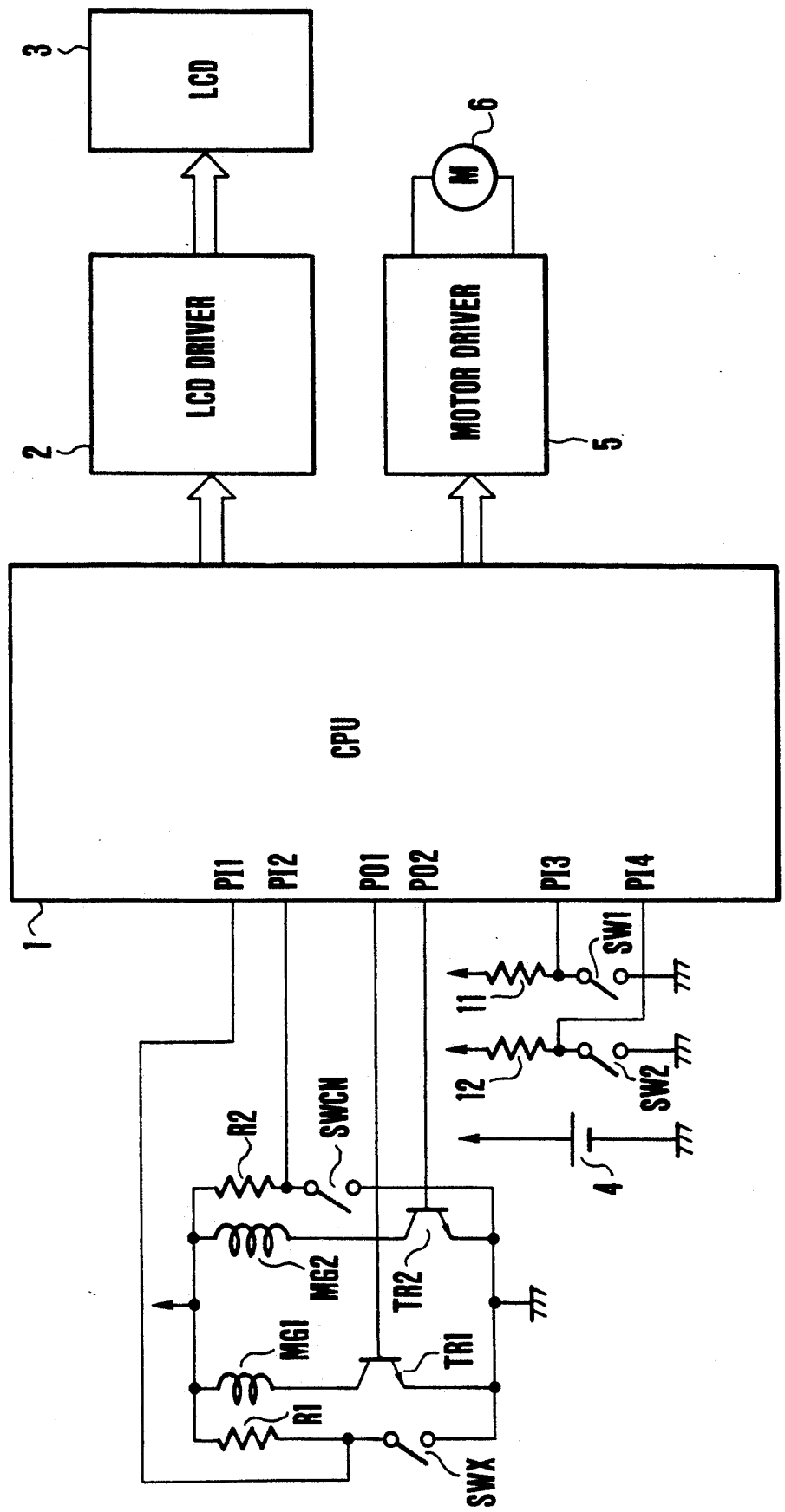
FIG. 1 is a block diagram showing the circuit arrangement of an embodiment of this invention.

FIG. 1 shows in a block diagram the circuit arrangement of a camera according to an embodiment of this invention. The camera is provided with a one-chip microcomputer 1 (hereinafter referred to as CPU) which is arranged to control the actions of the camera. Within the CPU 1, a ROM in which a program is written, a RAM which stores data, IO (input and output) ports, a timer circuit, etc. are connected through an address bus and a data bus to an arithmetic circuit which performs an arithmetic operation. An LCD (liquid crystal display) driver 2 is arranged to make a display on an LCD panel 3 in accordance with a signal coming from the CPU 1. A battery 4 serves as a power source. A motor driver 5 is arranged to drive a motor 6 in accordance with a signal coming from the CPU 1. With the motor 6 driven, a mirror is moved up and retracted from a photo-taking optical path (not shown) or moved back down to its original position; and a shutter charging action is performed. Switches SW1 and SW2 are arranged to be responsive to a shutter release button of the camera. The switch SW1 turns on in response to the first stroke of the release button. The switch SW2 turns on in response to the second stroke of the release button. The switches SW1 and SW2 are connected to the power supply via pull-up resistors 11 and 12 and are also connected to input ports PI3 and PI4 of the CPU 1.

The program of the CPU 1 is arranged as follows: The camera actions such as AF (automatic focusing) and AE (automatic exposure) actions are performed when the switch SW1 turns on. A shutter release action is performed when the switch SW2 turns on. Electromagnets MG1 and MG2 are provided for shutter control and are arranged as follows: When the electromagnetic MG1 and MG2 are turned off while the mirror is in its up state, the leading and trailing curtains of the shutter are respectively allowed to travel. A switch SWX is arranged to turn on when the leading curtain (or a leading blade group of the shutter) travels and to turn off when the shutter is charged. The switch SWX is pulled up to the power supply by a resistor R1 and is connected to an input port PI1 of the CPU 1. A switch SWCN is arranged to turn off when the trailing curtain (or a trailing blade group of the shutter) travels and to turn on upon completion of the shutter charging action. The switch SWCN is pulled up to the power supply by a resistor R2 and is connected to an input port PI2 of the CPU 1. The connection with these switches enables the CPU 1 to detect the traveling states of the leading and trailing curtains of the shutter. Transistors TR1 and TR2 are provided for driving the electromagnets MG1 and MG2. The bases of the transistors TR1 and TR2 are respectively connected to output ports PO1 and PO2 of the CPU 1.

The embodiment which is arranged as described above operates as described below with reference to FIG. 2 which is a flow chart:

The camera actions such as AE and AF actions are omitted from description. The following description is limited to a case where a shutter release action is performed with the switch SW2 turned on.

Figure 2:
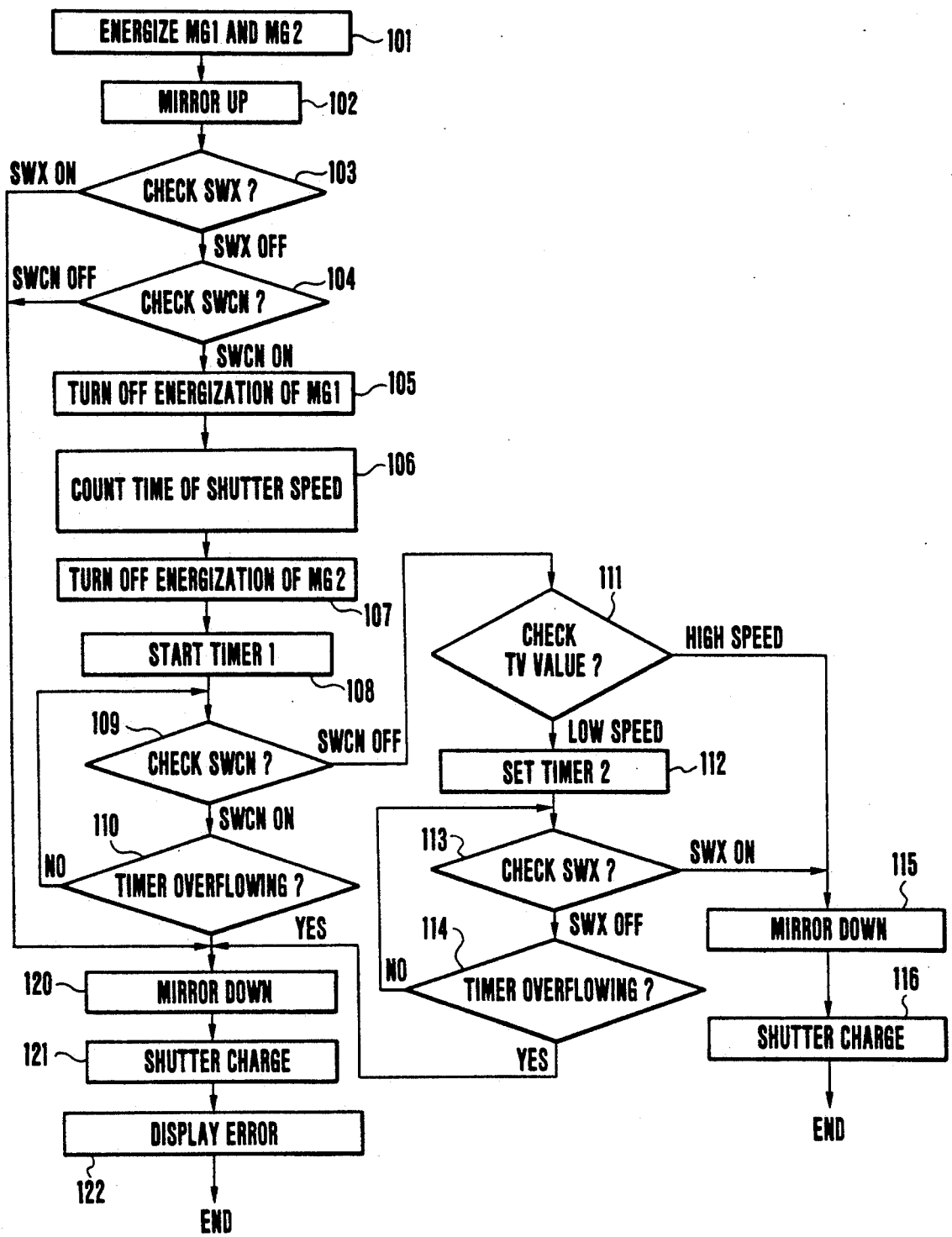
FIG. 2 is a flow chart showing the operation of the circuit arrangement shown in FIG. 1.

Referring to FIG. 2, the sequence of shutter release processes are as follows: At a step 101 of the flow of operation, the eletromagnets MG1 and MG2 are energized by turning the transistors TR1 and TR2 on to make the shutter ready to operate. Step 102: A current is applied to the motor 6 to move up and retract the mirror from the photo-taking optical path. Step 103: The switch SWX is checked for its state. If the switch SWX is found off, the flow comes to a step 104. Step 104: The switch SWCN is checked to find if the switch SWCN is on, thus indicating that the shutter has been charged and readied for a next travel. If either the switch SWX is found on or the switch SWCN is found off, the switch position indicates that the shutter is not in a normally charged state. In that case, therefore, the flow comes to an error handling process which begins at a step 120.

If the shutter is normally charged, the flow of operation comes to a step 105. Step 105: The power to the electromagnet MG1 is first turned off to allow the leading curtain of the shutter to travel. Step 106: The flow waits for the lapse of time corresponding to a preset shutter speed. Step 107: After the lapse of time of the shutter speed, the power to the electromagnet MG2 is turned off to allow the trailing curtain of the shutter to travel. By this action, the surface of the film or a CCD is exposed to light for a period of time corresponding to the preset time value of shutter speed.

Step 108: The time count of a timer 1 begins. The timer 1 has been set at a sufficiently longer time than the traveling time of the shutter curtain, that is, longer than a length of time required for causing, by a spring or the like, the trailing curtain to travel from its retracted position to a light blocking position across the aperture of the shutter. An overflow signal is issued after the lapse of the time set at the timer 1. Step 109: The on/off state of the switch SWCN is checked. Step 110: A check is made for the output of the overflow signal. The steps 109 and 110 are repeated until the timer 1 overflows. When the switch SWCN turns off, the flow proceeds to a next process. However, if the switch SWCN remains on when the timer 1 overflows, it indicates a failure of the normal travel of the trailing curtain of the shutter. In that event, therefore, the flow comes to the step 120 to perform the error handling process which begins with the step 120.

When the switch SWCN is found off at the step 109, the flow comes to a step 111. Step 111: The shutter speed value TV is checked to judge whether the preset shutter speed is a high or low speed. The judgment is made, for example, according to whether or not the preset shutter speed is faster than a shutter speed obtained with the trailing curtain allowed to travel immediately after the turning on of the switch SWX.

If the preset shutter speed is judged to be a low speed, the flow comes to a step 112. Step 112: A time 2 is set. In this case, the timer 2 is at a time value which is sufficiently long to allow to settle any chattering that takes place when the switch SWX is operated to dissipate. Step 113: the switch SWX is checked for its action. Step 114: A check is made for the overflow of timer 2. Step 115: If the switch SWX turns on, the mirror is moved down. Step 116: The shutter is charged and the sequence of shutter release processes comes to an end. In a case where the switch SWX does not turn on even after the overflow of the timer 2, it indicates a failure of the normal action of the leading curtain of the shutter. In that event, the flow comes to the step 120 for the error handling process.

If the preset shutter speed is determined at the step 111 to be a high speed, the flow comes to the step 115 to bring the sequence of shutter release processes to an end without checking the switch SWX.

In the event of an abnormality, the flow comes to the step 120. Step 120: The mirror is moved down. Step 121: The shutter is charged. Step 122: A warning is given by making an error display.

In the case of a high-speed shutter value, this embodiment is arranged not to check the switch SWX after the travel of the shutter, as described above. However, this arrangement may be changed to check the switch SWX for every shutter speed value by setting the timer 2 at a longer time value at the step 112.

Further, the error warning is not limited to the LCD display. The error warning may be given by means of some sound-emitting element such as a buzzer.

The error handling process may be changed to give a warning to the operator by keeping the mirror in its up state without moving the mirror down.

The embodiment, as described in the foregoing, is arranged to confirm the operating state of each of the leading and trailing curtains of the shutter before and after they travel and also to confirm the changes taking place in the states of these shutter curtains, so that any abnormality of the shutter operation can be accurately detected without failure.

Further, in practicing this invention, a flash-synchronizing X contact can be utilized as the switch SWX for detecting the state of the leading curtain; and a switch which is provided for proceeding with the sequence of processes by detecting completion of the shutter driving process can be utilized as a switch for detecting the state of the trailing curtain. The use of these existing switches for the combined functions obviates the necessity of using any additional switches for detection of the abnormalities of the shutter.

What is claimed is:

1. A camera having a shutter device including a leading curtain and a trailing curtain, comprising:
   a) first switch means for detecting a ready-to-travel state and a travel-completed state of said leading curtain;
   b) second switch means for detecting a ready-to-travel state and a travel-completed state of said trailing curtain; and
   c) decision means arranged to determine before an operation of said shutter device that said shutter device is abnormal, when at least one of the ready-to-travel state of said leading curtain is not detected by said first switch means and the ready-to-travel state of said trailing curtain is not detected by said second switch means, and said decision means determining that said shutter device is abnormal after completion of control over the traveling states of said leading and trailing curtains by said shutter device, when the travel-completed state of said leading curtain is not detected by said first switch means within a predetermined period of time after the travel-completed state of said trailing curtain is detected by said second switch means.

2. A camera according to claim 1, further comprising indicating means for indicating a determination by said decision means that the shutter device is abnormal.

3. A camera according to claim 2, wherein said indicating means includes an optical display.

4. A camera according to claim 2, wherein said indicating means is arranged to indicate the abnormality of said shutter device by stopping a motion of a camera acting member.

5. A camera according to claim 1, wherein said decision means is arranged to determine that said shutter device is abnormal when the travel-completed state of said leading curtain is not detected by said first switch means within a period of time that allows shutter curtain chattering to dissipate, after the travel-completed state of said trailing curtain is detected by said second switch means.

6. A camera according to claim 1, wherein said decision means is arranged to accept a result of detection made by said first switch means after completion of control by said shutter device over the traveling states of said leading and trailing curtains, only in a case where a set shutter speed of the camera is lower than a predetermined shutter speed value.

* * * * *

UNITED STATES PATENT AND TRADEMARK OFFICE
CERTIFICATE OF CORRECTION

PATENT NO. : 5,257,056
DATED     : October 26, 1993
INVENTOR(S) : Jiro KAZUMI

It is certified that error appears in the above-identified patent and that said Letters Patent is hereby corrected as shown below:

<u>Column 2</u>
   Line 66, "eletromagnets" should read --electromagnets--.

<u>Column 3</u>
   Line 21, "the" (second occurrence) should read --a--.
   Line 53, "to settle" should be deleted.

Signed and Sealed this

Twenty-seventh Day of September, 1994

Attest:

BRUCE LEHMAN

Attesting Officer        Commissioner of Patents and Trademarks